May 9, 1950          J. B. WALKER          2,506,947
PHOTOGRAPHIC CAMERA LENS SYSTEM
Filed Dec. 15, 1947          2 Sheets-Sheet 1
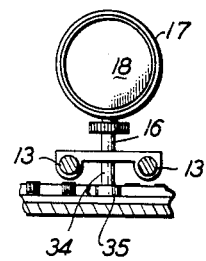
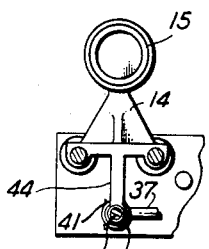
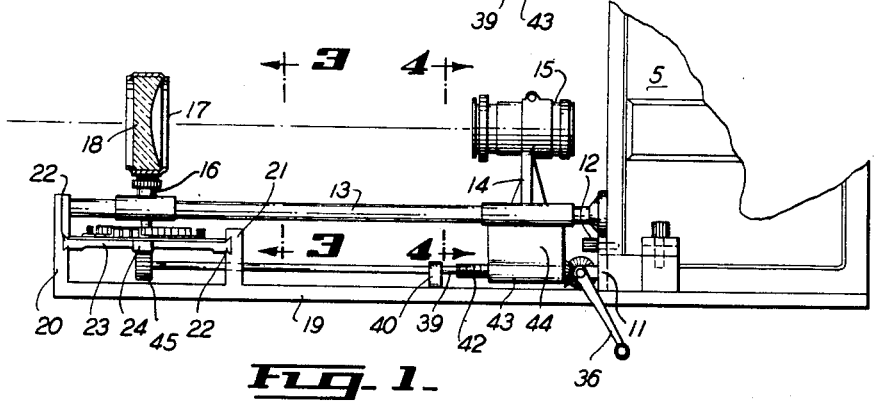
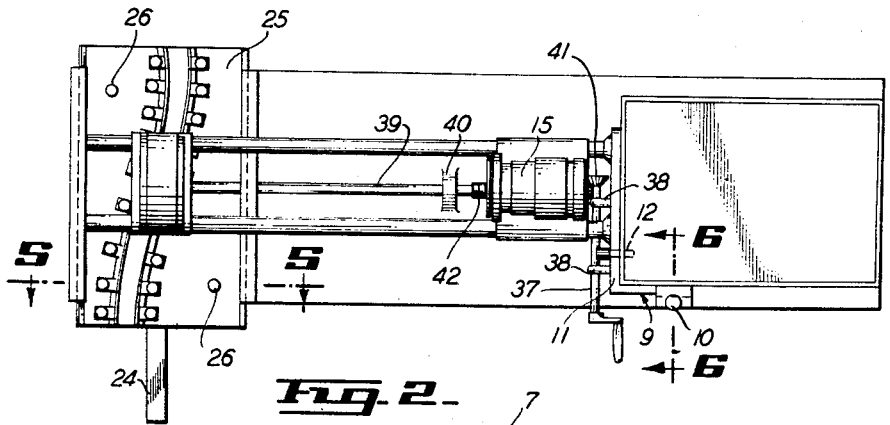
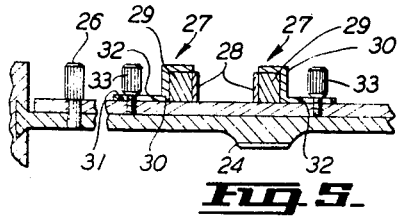
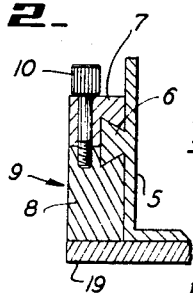
INVENTOR.
JOSEPH B. WALKER
BY
Westall & Westall
ATTORNEYS May 9, 1950            J. B. WALKER            2,506,947
PHOTOGRAPHIC CAMERA LENS SYSTEM Filed Dec. 15, 1947            2 Sheets-Sheet 2

INVENTOR.
JOSEPH B. WALKER
BY Westall & Westall
ATTORNEYS

Patented May 9, 1950

2,506,947

UNITED STATES PATENT OFFICE 2,506,947

PHOTOGRAPHIC CAMERA LENS SYSTEM

Joseph B. Walker, Hollywood, Calif.

Application December 15, 1947, Serial No. 791,897

4 Claims. (Cl. 88—57)

This invention relates to photographic cameras, and more specifically contemplates an attachment for motion picture cameras by which the lens system may be adjusted while the camera is in use.

In the motion picture art, it is often desirable that the photographic representations give the illusion of movement of the actors or other subjects photographed toward or away from the viewer without the actual change of position of the set, or more frequently that the picture include in the same sequence a view of the background and a close-up of the actors. Camera dollies by which cameras and their operators may be shifted with respect to the set are commonly employed for this purpose. However, numerous situations of this type arise that cannot be effectively handled by conventional dollies, and the expense of manufacturing or modifying dollies for single sequences is many times exorbitant. To overcome this problem, cameras are equipped with dual lens systems adapted to be manually shifted to coincidentally effect a progressive magnification of the scene, and to compensate for focusing maladjustment incident to such change in magnification. Apparatus of this type is disclosed in my Patent Number 1,898,471, granted February 21, 1933. In the device of this patent the forward secondary lens is actuated by a transverse cam controlled by mechanism by which the primary lens system is shifted. However, as the axial lens adjustment required is extremely critical, and as it varies with the characteristics of the lenses employed, different cam plates must be utilized with each lens assembly. The contour of the cam also varies with the range in the distance between the camera and photographic subject. Moreover, changes in temperature or humidity may change the characteristics of a lens to a degree as to compel correction in the contour of the cam in order to obtain identity of results upon successive uses of the same lens systems. Accordingly, each use of a lens in the manner indicated requires pre-determination and test of the contour of the cam. Another and principal factor tending to discourage extensive use of prior mechanism of the type referred to is that, due to the weight of the lens assembly to be moved, the cam follower tends to flatten the cam to a material degree, even if the cam is composed of extremely hard materials.

It is a principal object of the present invention to largely obviate the difficulties above mentioned by the provision of a device for shifting lens assemblies coaxially with respect to one another and the camera proper so as to vary the magnification while maintaining the subject in focus, wherein the means for inducing the required movement of one of the lenses is itself adjustable to permit of variations in the relative movement of the lenses.

More specifically, an object hereof is the provision of a dual lens assembly actuated by a single control to accomplish the coincident as well as relative coaxial movement of the respective lens elements according to a pre-calculated pattern, embodying a flexible cam, operable incident to its transverse movement to compel the axial movement of one of the lens elements, the cam being adjustable to obtain and fix any desired contour so as to correspondingly determine the velocity and degree of movement of the lens element actuated thereby with respect to that of the other elements during operation of the single control.

Another object is to provide a dual cam comprising a pair of flexible strips adapted to receive therebetween the follower of a lens system to be shifted by the cam, in combination with means for fixing, individually, each of a plurality of different reaches of the respective strips so as to maintain any contour to which the cam is manually adjusted, for compelling axial movement of the lens system controlled by the cam at the speed required for, and in synchronism with, any complementary manually-induced movement of the other lens element.

Still another object is to provide a variable rotary cam arranged about the lens axis in an arc of a diameter greater than the angle of the lens in combination with a dual follower carried by the lens to engage the opposite surfaces of the cam for shifting the lens axially at a speed and in a direction variable with the direction and speed of rotation, and the adjusted contour of the cam.

Numerous other objects, such for example as simplicity of the mechanism which is reflected in economy of manufacture, facility of adjustment of the cam, long life and extension of utility of conventional cameras in the type of photography contemplated by the employment of devices of the character herein alluded to, will be apparent to those of skill in the art upon examination of the following description read in the light of the accompanying drawings, in which:

Fig. 1 is a side elevation of one embodiment of my invention operatively associated with a motion picture camera;

Fig. 2 is a plan view of the assembly shown in Fig. 1;

Fig. 3 is a sectional view taken on line 3—3 of Fig. 1, showing one of the composite cam strips partially broken away so as to expose the cam follower;

Fig. 4 is a sectional view taken on line 4—4 of Fig. 1, showing the rearward lens assembly and worm drive therefor;

Fig. 5 is a sectional view taken on line 5—5 of Fig. 2 through the cam plate, gear rack and composite cam;

Fig. 6 is a section on line 6—6 of Fig. 2, depicting the clamp by which the camera and lens guides are rigidly connected;

Referring to the drawings in detail, the numerals of which indicate similar parts throughout the several views, 5 designates generally a motion picture camera which, being of conventional construction, is not illustrated in detail or further described.

Figure 7:
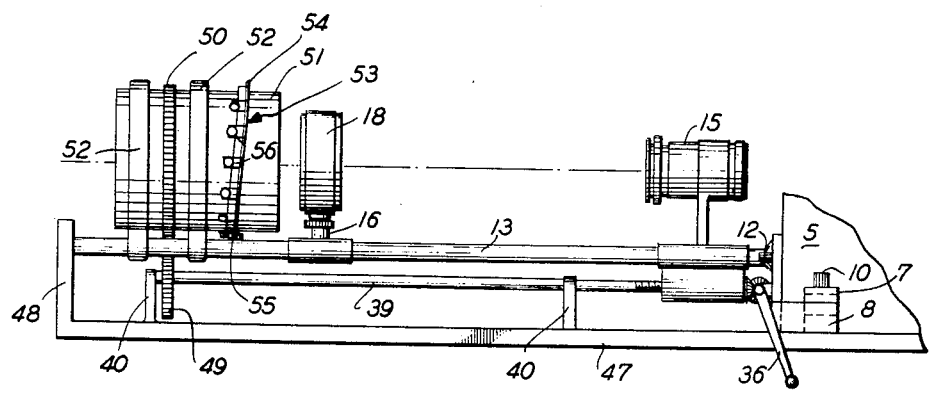
Fig. 7 is a side elevation of a modified form of my invention with the camera broken away.

It will be understood that the camera is adapted to be mounted upon a tripod or other support (not shown). Secured to the side of camera 5 adjacent its forward wall is a dovetailed tenon 6 (Figs. 1 and 6) adapted to be releasably clamped between an element 7 and a complementarily-formed leg 8 of an L-shaped bracket 9 disposed therebelow and extending parallel to the base of the camera. A thumb screw 10, projecting downwardly through the clamping element 7 and threaded into the bracket 9 is effective to secure the camera and bracket together with the forward wall of the camera in contiguous relationship with the transverse leg 11 of the bracket. 12 indicates a thumb screw carried by the bracket leg 11 and threaded into the camera to reinforce the fixed relationship of the latter elements as initially determined by the clamp.

One end of each of a pair of guide rods 13 is mounted in the transverse leg 11 of bracket 9 so as to project forwardly of the camera, with the rods disposed in parallel relationship equi-spaced to opposite sides of a vertical plane coinciding with the lens axis.

Slidable upon rods 13 for movement toward and away from the camera, is a standard 14 for the support of a primary lens system 15. Similarly, a standard 16 supporting a frame 17 for a secondary lens 18 is independently slidable upon the forward ends of rods 13 which maintain the structurally separate lens systems 15 and 18 in co-axial alignment.

To reinforce guide 13 for the primary and secondary lens systems, as well as to support actuating mechanism for shifting the lenses in accordance with the operation hereof, I provide a base plate 19 secured by suitable means to the underside of the camera, plate 19 being formed with an opening (not shown) below the camera through which the tripod attachments may project. The outer or forward end of base plate 19 is formed with an upstanding wall 20 into which the ends of the guide rods 13 are rigidly mounted. Spaced rearwardly from and integral with base plate 19 is a transverse rail 21 arranged in parallel spaced relationship with the wall 20. Dovetailed as at 22 in opposing surfaces of rail 21 and wall 20, respectively, are the lateral edges of a gear rack plate 23 whereby the latter is free to slide across the base 19 in a direction forming a right angle with the common lens axis. Depending from the underside of plate 23 and extending parallel to the rail 21 and wall 20, is a gear rack 24 by which the plate 23 is shifted in response to actuation by mechanism hereinafter described.

Superposed upon rack plate 23 is a cam plate 25 normally held against lateral displacement by a pair of dowel pins 26 having knurled heads (see Figs. 2 and 5), but easily removable for substitution of a cam plate bearing a cam of different general contour, as will appear. A dual flexible cam 27 is carried by plate 25, comprising a pair of cam strips 28, composed of steel, which are secured independently of one another by suitable means to separate elongated body sections 29 composed of a soft material such, for example, as lead. A plurality of angles 30 are attached in equi-spaced relationship to the back and upper surface of each cam body section 29, and are equipped with integral feet 31 adapted to lie flat upon the cam plate 25. Each foot 31 of each angle 30 is longitudinally slotted, as at 32, and the slot transfixed by a thumb screw 33 threaded into the cam plate 25. With the screws 33 loosened, the reaches of the cam to which the angles 30 are attached, respectively, are permitted a range of lateral movement determined by the lengths of the slots 32. Thus the contour of the cams 27 may be adjusted to meet specific requirements. Each reach of each cam 27 may be secured in position with respect to the plate 25 by tightening the thumb screw 33 extending through the foot 31 of the angle 30 associated therewith.

Secured to and depending from the middle of the standard 16 in which the secondary lens assembly 18 is mounted, is a rod 34, having a roller 35 journalled on its lower end for suspension between the opposed cam strips 28, so as to receive the lateral thrust of the strips in response to movement of the cam plate 25 in the grooves 22 of rail 21 and wall 20.

In order to shift the primary lens system 15 axially, and the cam plate 25 laterally, I provide a crank 36 disposed adjacent but forward and laterally of the camera, which is splined to the outer end of a short shaft 37 journalled in bearings 38 carried by the transverse leg 11 of the bracket 9. The opposite end of shaft 37 terminates adjacent the rearward end of a second shaft 39 forming a right angle therewith and axially coinciding with a vertical plane equi-spaced between the guide rods 13. Shaft 39 is journalled in a pair of bearings 40 mounted upon the base plate 19 and in the rail 21, respectively. Bevel gears 41 carried by the adjacent ends of shafts 37 and 39 are in mesh to transmit the motion of crank 36 to the shaft 39. Keyed to the latter shaft adjacent the bevel gears 41 is a worm 42 which extends through a complementary and internally-threaded follower 43 carried by the lower end of an arm 44 depending from and integral with the standard 14 by which the primary lens system 15 is supported, whereby rotative movement of shaft 39 in response to actuation of the crank 36 is effective to axially shift the primary lens system. The forward end of shaft 39 intermediate wall 20 of base plate 19 and rail 21 supports a pinion 45, the teeth of which are in mesh with the rack 24 of plate 23, whereby the cam assembly is shifted laterally coincident with the axial movement of the primary lens system 15. It will be appreciated that while the primary lens system is shifted at a speed determined solely by the rotation of crank 36, the speed of movement of the secondary lens system 18 depends not only upon the rotation of the crank, but also upon the precise preadjusted contour of the cam 27.

By turning crank 36 during use of the camera, not only may an adjustment of the lens systems 15 and 18 necessary to obtain the proper magnification be accomplished, but that by preadjustment of the composite cam 27 compensation for the shifting of the lens system 15 with respect to the subject to be photographed and the film may be effected so as to maintain the subject in focus. As hereinabove indicated, due to the essential differences between almost any pair of lenses and the critical adjustment of the position of the respective lens systems required to accomplish the desired result, the shape of the cam 27 must be different for each lens employed. Changes in the distance between the camera and the subject to be photographed, as well as variations in the degree of magnification necessary for the particular effect desired also compel the utility of cams of different contour. These necessary modifications in the shape of the cam in order to permit utility of different lenses with the camera or, in some instances, successive use of the same lens system is primarily accomplished in the present invention by changing the contour of the flexible cam 27 in the following manner. However, where lens systems having characteristics for which compensation cannot be effected because of the limitations in cam adjustment imposed by the lengths of the slots 32 in the cam-reinforcing angles 30 are to be employed, the cam plate 25 may be removed with facility by displacement of the dowel pins 26 and another plate, bearing a dual cam more nearly approximating the desired contour, installed.

In accordance with the use of the apparatus, the primary lens system 15 and cam plate 25 are first shifted to corresponding ends of their range of movement by manipulation of the crank 36 so as to obtain the desired magnification for the subject at one end of the proposed photographic sequence. The thumb screws 33, threaded into the cam plate 25, are then loosened and the secondary lens element 18 shifted along the rods 13 in one direction or the other to bring the subject into proper focus, the roller 35 impelling the re-positioning of one of the strips 28. The other strip 28 is then moved against roller 35, and the two thumb screws 33 at opposite sides of, and nearest adjacent to, the cam-following roller 35 are tightened so as to lock in fixed position the reach of the cam strips 28, to which the adjacent angles 30, controlled by the two screws 33 thus actuated, are attached. Thereupon the crank 36 is again actuated to shift the primary lens 15 slightly toward the opposite end of its range of movement and coincidentally shift cam plate 25 a distance sufficient to place the next pair of opposed angles 30 and thumb screws 33 at opposite sides of the cam-following roller 35. The secondary lens element 18 is then again moved sufficiently to compensate for the movement of the primary lens system 15 and change the contour of the cam accordingly. The angles 30 at opposite sides of roller 35 are secured in place by the respective thumb screws 33 with the corresponding opposed sections of the respective strips 28 in contiguous relationship with the roller. In like manner the shape of the entire cam assembly is progressively altered and fixed by screws 33 to conform to the requirements of the particular lenses utilized, the distance between the camera and the subject to be photographed, as well as the constant or variable speed of progressive magnification required for best results. Thereafter the scene may be photographed with positive assurance that the dual cam 27—27 will synchronously move the secondary lens element 18 with the movement of the primary system 15 in response to actuation of crank 36 so as to maintain the subject in perfect focus at all times.

Figure 8:
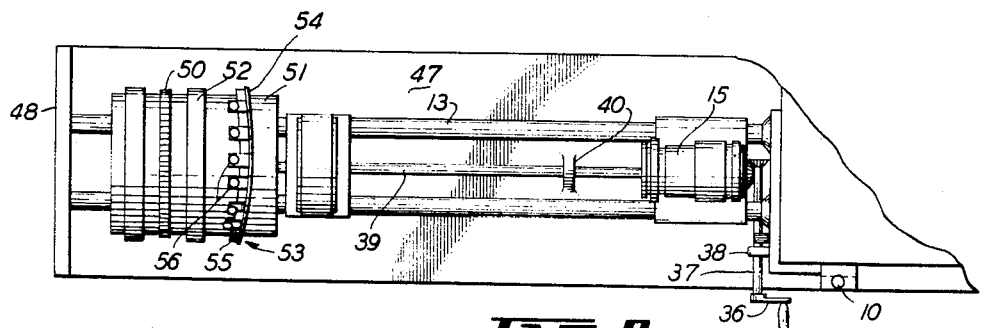
Fig. 8 is a plan view of the embodiment shown in Fig. 7.
Figure 9:
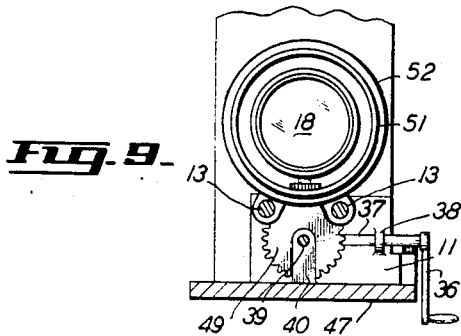
Fig. 9 is a front elevation of the unit of Figs. 7 and 8.
Figure 10:
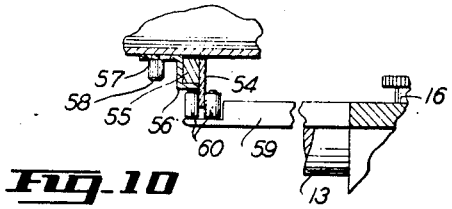
Fig. 10 is a vertical broken section through the lower arc of the cam, illustrating particularly the follower and its relationship with the lens system associated therewith.

In Figs. 7 to 10 I have illustrated a modified form of my invention incorporating a circular rotary cam. In this embodiment the base plate 47, while of slightly different form, is functionally similar, being equipped with an end wall 48 into which the guide rods 13 for the dual lens system are mounted in parallel relationship. The opposite ends of the rods are similarly secured to a bracket 9 adapted to be removably secured to the camera case. The rearward end of the base plate 47 is mounted to the underside of the camera so as to afford ample support for the guide rods 13 and lens assemblies mounted thereon. The shaft 39, journalled in bearings 40 supported upon the base plate 47, is similarly rotatably actuated and controlled by a crank 36 through the bevel gears 41. Accordingly, the primary lens system 15 is reciprocated directly in response to manipulation of the crank, as hereinabove described in connection with the embodiment of Figs. 1 to 6.

A spur gear 49 is splined to the outer end of shaft 39 to impart rotary motion to a gear ring 50 encircling and rigidly mounted upon a cylinder 51, journalled in a pair of bearings 52 mounted in spaced relation upon the outer end of the guide rods 13, whereby rotation of crank 36, impelling axial movement of the primary lens system 15 through the worm 42, coincidentally rotates the cylinder 51 in bearings 52. The cylinder is coaxially mounted with the lens systems 15 and 18, and has a bore of a diameter sufficient to avoid any limitations upon the field of the secondary lens system, regardless of the position of the latter in its range of movement, as is hereinafter described.

Encircling the rearward end of cylinder 51 is a cam 53 comprising a steel strip 54 reinforced by a member 55 composed of lead or other soft material. The steel strip 54 is of a width substantially greater than that of the reinforcing member 55, so as to project radially beyond the member for engagement by a cam follower hereinafter described. The cam assembly is of slightly greater diameter than the outer diameter of cylinder 51 so as to permit cam 53 to be moved freely over the surface of the cylinder and to assume different contours with respect to a diametric plane of the cylinder. In order to lock the cam 53 in any preadjusted contour, I provide a plurality of angles 56, secured to the back of the lead member 55 and arranged in equi-spaced relationship from end to end of the cam. Each of angles 56 is provided with a foot adapted to engage the outer surface of cylinder 51 and is formed with a slot 57 extending in parallel relationship with the axis of the cylinder. A thumb screw 58 extending through the slot 57 and threaded into the cylinder is adapted to lock the angle 56 and the reach of cam 53 secured thereto in any preadjusted relationship with respect to the ends of the cylinder permitted by the length of the slot. It will be understood that the slots 57 in the feet of the several angles 56 are each of sufficient width relative to the shank of the thumb screw 58 extending therethrough to permit the lateral play required for full variation in the contour of the cam as determined by the lengths of the slot 57.

The construction and arrangement of the components of the secondary lens system 18 is substantially the same as hereinbefore described with respect to the embodiment of Figs. 1 to 6, with the exception of the elimination of the rod 34 and roller 35. In the present embodiment, inasmuch as cam 53 is disposed forward of the primary lens system 15, the cam follower 59 projects laterally from the center of the lens standard 16 and supports on its outer end a pair of rollers 60 adapted to engage opposite sides of the radially-projecting annular portion of the steel cam strip 54.

Cam 53 is preadjusted by the operator in a manner similar to the adjustment of cam 27. The thumb screws 58 are first loosened and the crank 36 manipulated to shift the primary lens system 15 to one end of its range of movement so as to obtain the proper magnification of the subject. The secondary lens system 18 is then shifted axially on the guide rods 13 to obtain accurate compensation for the adjustment of the primary lens system 15, which operation coincidentally properly positions the reach of the cam 53 with which the rollers 60 are then engaged. Accordingly, the adjacent thumb screw 58 is tightened down and the crank 36 rotated sufficiently to shift the next reach of cam 53, i. e., that which is located opposite the next thumb screw 58, between the rollers of the follower 59. This operation coincidentally shifts the primary lens system 15 toward the opposite end of its range of movement whereupon a new adjustment of the secondary lens system 18 is made with a consequent re-positioning of the cam reach with which the rollers 60 are engaged. The adjacent thumb screw 58 is then tightened down. This operation is repeated for the entire range of movement of the primary lens system required for the particular sequence to be photographed with the result that the entire cam or section thereof to be utilized is adjusted in a manner which assures the coincident uninterrupted movement of the secondary lens system 18 necessary to effect the focusing compensation for the primary lens throughout the range of movement of the latter in response to rotation of crank 36 during the exposure.

It will be understood that the ratio between the spur gear 49 and gear ring 50 is such as to result in a single revolution or part thereof corresponding to the lineal length of the cam during the movement of the primary lens system from one end of its range of movement to the other. While a cam substantially equal in length to the circumference of the cylinder will vary in length with the diameter of the cylinder 51 employed, it will be appreciated that a spiral cam may be utilized which is independent of the size of the cylinder employed. A more critical progressive adjustment of the secondary lens system may be obtained by increasing the length of the cam with compensatory variation in the gear ratio between the gears 49—50 and worm 42.

It will be appreciated that the camera shown in the drawings is merely illustrative of any conventional type of motion picture camera, and that the details of the attachment, the form of the supporting plate 19 or 47, the mode of connection between the attachment and camera, and the guide means for the respective lens systems as well as the size, shape and proportion of the various parts, may be modified in many ways, and that the secondary lens system may be supported within the arc of the cam to conserve space, without departing from the spirit of my invention as defined in the appended claims. Moreover, as the cam plate may define an arc of a length less than a full circle and of any radius, in the following claims the term "transverse" as used to define the relationship of the cam or cam plate to the lens axis or the vertical plane coinciding with the lens axis, is intended to include any form of cam lying in said plane whether arcuate or flat.

What I claim and desire to secure by Letters Patent is:

1. In a camera lens system, a primary lens and a secondary lens, means to slidably support said lenses for coaxial movement, means to move said primary lens axially, and means to move said secondary lens axially coincidentally with the movement of said primary lens, said last-named means including a cam support adapted to carry a number of cams for moving the secondary lens to different positions, respectively, relative to the primary lens and a flexible cam on said support, said flexible cam being movable to delineate a number of different effective contours determinative of the extent and speed of movement of said secondary lens relative to said primary lens.

2. In a camera lens system, a primary lens and a secondary lens, means to support said lenses for coaxial relative movement, means to move said primary lens axially, and means synchronized with said last-named means to move said secondary lens axially, said last-named means including a flexible cam movable in a direction transverse to the axis of said lenses and operable in response to its contour to determine the speed of movement of said secondary lens relative to the speed of movement of said primary lens, and means to fix said flexible cam in any of a plurality of different contours.

3. In a camera lens ssytem, a primary lens and a secondary lens, means to support said lenses for coaxial relative movement, means to move said primary lens axially, means synchronized with said last-named means to move said secondary lens axially, said last-named means including an arcuate flexible cam movable rotatably about a center coinciding with the lens axes and operable in response to its contour to determine the speed of movement of said secondary lens relative to the speed of movement of said primary lens, and means to fix said flexible cam in any of a plurality of different contours.

4. In a camera lens system, a primary lens and a secondary lens, means to support said lenses for coaxial relative movement, means to move said primary lens axially, means synchronized with said last-named means to move said secondary lens axially, said last-named means including an arcuate flexible cam operable in response to its contour to determine the speed of movement of said secondary lens relative to the speed of movement of said primary lens, said cam defining an arc having a center upon the common axes of said lenses and rotatable about the center of said arc, and means to fix said flexible cam in any of a plurality of different contours.

JOSEPH B. WALKER.

REFERENCES CITED

The following references are of record in the file of this patent:

UNITED STATES PATENTS

| Number | Name | Date |
| --- | --- | --- |
| 1,174,547 | Clason | Mar. 7, 1916 |
| 1,755,105 | Douglass | Apr. 15, 1930 |
| 1,790,232 | Flora | Jan. 27, 1931 |
| 1,879,412 | Mueller | Sept. 27, 1932 |
| 1,898,471 | Walker | Feb. 21, 1933 |
| 2,159,394 | Mellor et al. | May 23, 1939 |
| 2,165,341 | Capstaff et al. | July 11, 1939 |
| 2,364,837 | Williams | Dec. 12, 1944 |